United States Patent
Alfred et al.

(10) Patent No.: US 11,909,785 B2
(45) Date of Patent: Feb. 20, 2024

(54) VIDEO COMMUNICATIONS SYSTEM FOR RIDESHARE SERVICE VEHICLE

(71) Applicant: GM Cruise Holdings LLC, San Francisco, CA (US)

(72) Inventors: Ajay Alfred, San Francisco, CA (US); Alexander Willem Gerrese, San Francisco, CA (US); Aakanksha Mirdha, San Francisco, CA (US); Jeremy Stephen Juel, San Francisco, CA (US); Grace Noh, San Francisco, CA (US); Swarnakshi Kapil, Sunnyvale, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 129 days.

(21) Appl. No.: 17/563,468

(22) Filed: Dec. 28, 2021

(65) Prior Publication Data

US 2023/0103180 A1    Mar. 30, 2023

Related U.S. Application Data

(63) Continuation of application No. 17/485,872, filed on Sep. 27, 2021, now Pat. No. 11,811,836.

(51) Int. Cl.
*H04L 65/403* (2022.01)
*H04L 67/12* (2022.01)
*G06Q 50/30* (2012.01)
*H04R 1/08* (2006.01)
*H04L 67/53* (2022.01)

(52) U.S. Cl.
CPC .......... *H04L 65/403* (2013.01); *G06Q 50/30* (2013.01); *H04L 67/12* (2013.01); *H04L 67/53* (2022.05); *H04R 1/08* (2013.01); *H04R 2499/13* (2013.01); *H04R 2499/15* (2013.01)

(58) Field of Classification Search
CPC ....... H04L 67/12; H04L 67/53; H04L 65/403; H04R 1/08; H04R 2499/15; H04R 2499/13; G06Q 50/30
USPC ............................................. 348/14.01–14.16
See application file for complete search history.

(56) References Cited

U.S. PATENT DOCUMENTS

| | | |
|---|---|---|
| 2006/0215589 A1* | 9/2006 | Taborisskiy ........... H04N 7/141 348/E7.078 |
| 2013/0342637 A1 | 12/2013 | Felkai et al. |
| 2014/0139676 A1* | 5/2014 | Wierich ................. H04N 5/272 348/148 |
| 2017/0323074 A1 | 11/2017 | Chiang |
| 2019/0061619 A1* | 2/2019 | Reymann ................ B60Q 9/00 |
| 2021/0362746 A1 | 11/2021 | Choi et al. |
| 2023/0082825 A1 | 3/2023 | Gerrese et al. |

FOREIGN PATENT DOCUMENTS

WO    2020222333 A1    11/2020

* cited by examiner

*Primary Examiner* — Melur Ramakrishnaiah
(74) *Attorney, Agent, or Firm* — Akona IP PC

(57) ABSTRACT

A method for a video communication system for a rideshare system includes conducting at least a portion of a video communication session involving a passenger using at least one exterior audio/video component on an exterior surface of an AV dispatched to a designated location; and transferring the video communication session to at least one interior audio/video component on an interior of the AV.

16 Claims, 9 Drawing Sheets

VIDEO COMMUNICATIONS SYSTEM FOR RIDESHARE SERVICE VEHICLE

CROSS-REFERENCE TO RELATED APPLICATION

This application claims the benefit of and priority from U.S. patent application Ser. No. 17/485,872, filed Sep. 27, 2021, entitled "VIDEO COMMUNICATIONS SYSTEM FOR RIDESHARE SERVICE VEHICLE", incorporated herein by reference in its entirety.

TECHNICAL FIELD OF THE DISCLOSURE

The present disclosure relates generally to rideshare services provided using autonomous vehicles (AVs) and, more specifically, to devices and methods for a video communications system (VCS) for AVs used in providing rideshare services.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DESCRIPTION OF EXAMPLE EMBODIMENTS OF THE DISCLOSURE

Overview

Figure 1:
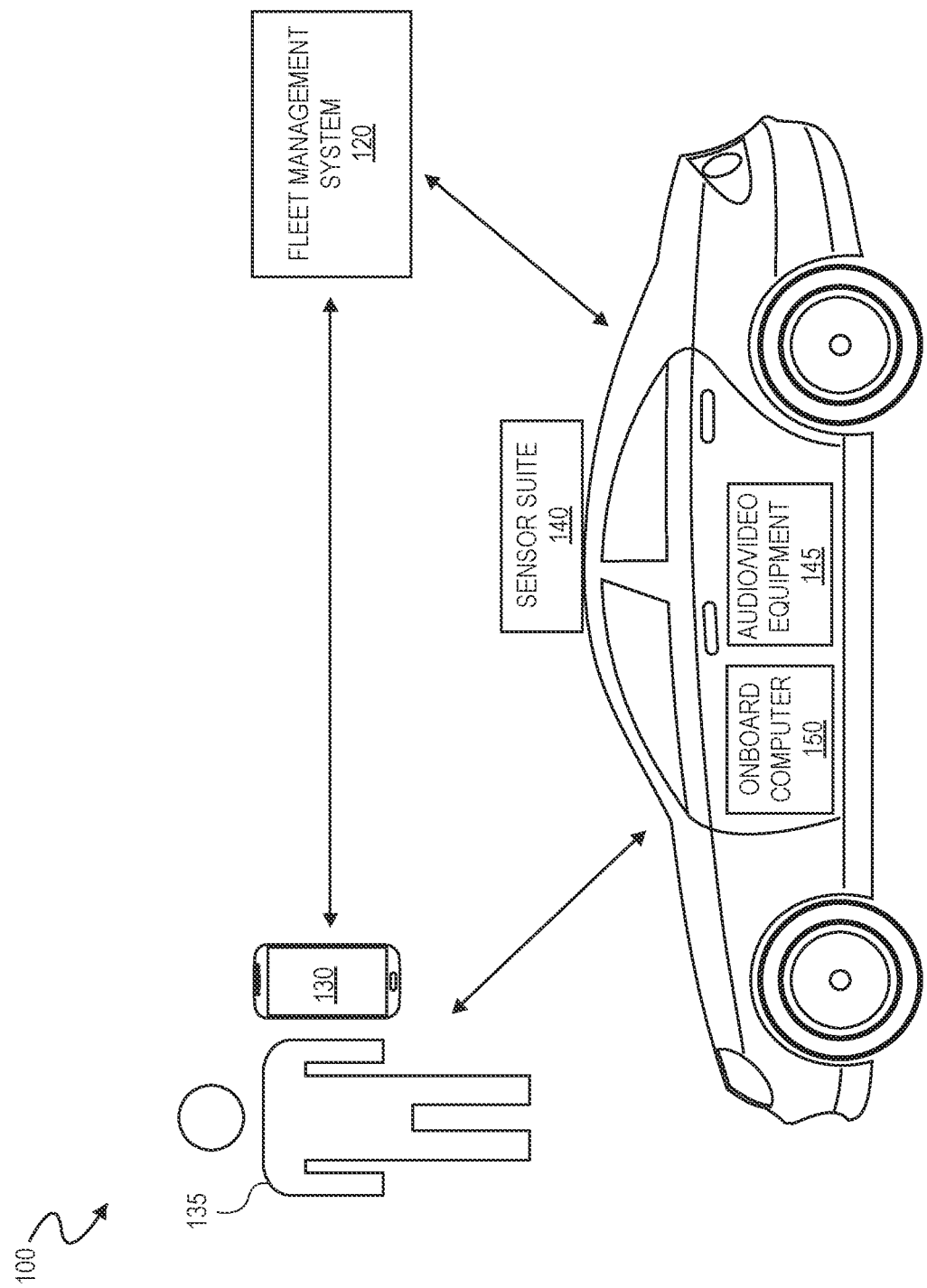
FIG. 1 is a block diagram illustrating an environment including an example AV in which aspects of a VCS for AV rideshare services according to some embodiments of the present disclosure may be implemented.

The systems, methods, and devices of this disclosure each have several innovative aspects, no single one of which is solely responsible for all of the desirable attributes disclosed herein. Details of one or more implementations of the subject matter described in this Specification are set forth in the description below and the accompanying drawings.

Given the numerous advantages of rideshare and delivery services (which services may be collectively referred to herein simply as "rideshare services") provided by AVs, it is anticipated that AV rideshare services will soon become the ubiquitous choice for various user transportation needs, including but not limited to school commutes, airport transfers, and long distance road trips, to name a few. For example, AV rideshare services provide a convenient option for providing transportation of a user's loved one to or from the airport when the user is unavailable to do so, due to work or personal conflicts, for example. In these situations, however, both the loved one and the user miss out on the opportunity to personally bid farewell or greet their loved one at the airport. Similarly, while the elimination of a human driver, and therefore human error and other risks, make AV rideshare services an appealing choice for transporting a child to or from school and other locations at times when a parent or other caregiver is unable to do so, the lack of a human driver may leave the child feeling lonely and scared, as well as unsure of which AV to enter.

Additionally, certain embodiments of AVs deployed for providing rideshare services may lack windows that the passenger can easily open and close. Moreover, the windows of the AV may be strategically tinted to provide privacy to the passenger inside the AV, making communication by the passenger with the outside world difficult if not impossible.

Embodiments described herein include a VCS for enabling an AV rideshare service user to take advantage of the many benefits particularly afforded by AVs while supporting opportunities for the user to interact with third parties before and/or during the rideshare service, which opportunities may otherwise be unavailable due to certain inherent features of AVs. In particular, embodiments described herein leverage a number of onboard cameras, microphones, displays, and speakers provided in the interior and on the exterior of an AV to enable such communication between an AV rideshare service user and one or more third parties in connection with the rideshare service.

In one embodiment, the VCS includes one or more displays, which in certain embodiments comprise large, high definition (HD) displays, and associated speakers on the exterior of the AV (for example, on or near doors on one or both sides of the AV). In certain embodiments, the display and speakers may be used to present to a passenger approaching the AV a live video feed of a third party (e.g., a friend or family member of the passenger), who may be the person who requested the rideshare service for the passenger (e.g., as may be the case where a parent user requests a rideshare service for a child passenger). In some embodiments, the live video feed may serve to identify the AV to the passenger, who will presumably recognize the third party in the video presented on the display. The live video feed may include a video conference that enables two-way communication between the passenger and the third party, in which case cameras and microphones provided on the exterior of the AV are used to capture images and audio of the user to provide to the third party via the video conference. Additionally and/or alternatively, the live video feed may provide an opportunity for the friend or family member to communicate with the passenger (e.g., provide a welcome or farewell message). As an alternative to a live video feed, a recorded video clip may be presented with the exterior display/speakers and may be looped for a period of time (e.g., until the passenger enters the AV). As another alternative, one or more still images, which may comprise a slide show, may be presented to the passenger with the exterior display/speakers and may also be looped for a period of time (e.g., until the passenger enters the AV). In accordance with certain features of the embodiment, when the images displayed on the exterior display form a part of a video conference between the passenger and a third party, the video conference may be seamlessly transferred from the exterior audio/video equipment (e.g., one or more of each of a camera, a microphone, a speaker, and a display provided on the exterior of the AV) to interior audio/video equipment (e.g., one or more of each of a camera, a microphone, a speaker, and a display) provided inside the AV so that the passenger and the third party can continue their video conference throughout the passenger's ride.

In yet another embodiment, the exterior display and associated speakers of the VCS may be used to present video, audio, and/or images of the user inside the AV, which video, audio, and/or images of the user are obtained using one or more cameras and/or microphones provided inside the AV, to enable the user to communicate with one or more third parties outside the AV. In this embodiment, one or more cameras and microphones provided on the exterior of the AV may be used to obtain images and audio for presentation to the user using a display and speaker inside the AV.

In still another embodiment, the VCS enables a passenger in a first AV to communicate with a passenger in a second AV using the interior audio/video equipment of both AVs. For example, video and audio of the first AV passenger would be captured by one or more interior cameras and microphones of the first AV and presented to the second AV passenger using an interior display and speakers of the second AV. Similarly, video and audio of the second AV passenger would be captured by one or more interior cameras and microphones of the second AV and presented to the first AV passenger using an interior display and speakers of the first AV. In certain aspects, exterior audio/video equipment of either or both of first and second AVs may be used to support communication before or after one or both of the passengers is inside the vehicle and may transition between interior and exterior equipment as desired, in a manner similar to that described above with reference to video conferencing between a user and a third party.

In still another embodiment, when the rideshare service is used for delivery of an item to a user, the user may communicate with the vendor of the item using the VCS, for example, if the delivered item is incorrect or damaged. In this embodiment, the audio/video equipment provided on the exterior of the AV is used to provide video and/or audio of the user to the vendor and to provide video and/or audio of the vendor to the user, assuming the user is outside the AV. Alternatively, if the user is inside the AV, the audio/video equipment provided on the interior of the AV may be used to provide video and/or audio of the user to the vendor and to provide video and/or audio of the vendor.

In certain embodiments, VCS may include a user application, or "app," that enables the user to initiate and/or control various aspects of embodiments described herein e.g., using an appropriate user interface (UI) displayed on a mobile device of a user (e.g., a mobile phone or tablet). In one embodiment, instead of and/or in addition to presenting video and/or audio using a display and speakers provided inside the AV, the video and/or audio may be presented via the UI of the user app. Additionally, in the embodiment described above with respect to contacting a vendor, a link for initiating contact with the vendor (e.g., via a video conference conducted using the AV audio/video equipment) may be provided on the UI of the user app, such that selection of the link by the user results in initiation of contact with the vendor, which interaction proceeds in the manner described above (i.e., using the audio/video equipment provided on (if the user is outside the AV when contact is initiated) or in (if the user is inside the AV when contact is initiated) the AV). Still further, the user may have an opportunity to send a link to a third party using the UI of the user app, which enables the recipient to initiate a video conference with the user using the audio/video equipment of the VCS, as described above. In other aspects, using the UI of the user app, the user may select a video clip and/or image, for example (e.g., an avatar) to be presented on the exterior display to facilitate easy identification of the AV dispatched for the user. The selected video clip and/or image may be stored in a user profile associated with the user in connection with the VCS.

Embodiments of the present disclosure provide a method including conducting at least a portion of a video communication session involving a passenger using at least one exterior audio/video component on an exterior surface of an AV dispatched to a designated location; and transferring the video communication session to at least one interior audio/video component on an interior of the AV.

Embodiments further include a method including conducting a video communication session between a user and a third party using a plurality of onboard audio/video components provided on an AV dispatched to provide a rideshare service to the user; wherein the conducting further includes presenting to the user at least one of a first video portion of the video communication session and a first audio portion of the video communication session using a first one of the onboard audio/video components; and capturing at least one of a second video portion of the video communication session and a second audio portion of the video communication session using a second one of the onboard audio/video components, wherein the second video portion comprises a video of the user and the second audio portion comprises audio of the user, wherein at least one of the onboard audio/video components comprises at least one of a display, a speaker, a camera, and a microphone.

Embodiments further include a VCS for an AV for providing rideshare services, the VCS including an exterior audio/video equipment (AVE) suite on an exterior of the AV; an interior AVE suite in an interior of the AV; and a VCS control module for using at least one of the exterior AVE suite and the interior AVE suite to conduct at least a portion of a video communication session involving a user.

As will be appreciated by one skilled in the art, aspects of the present disclosure, in particular aspects of a VCS for AV rideshare services described herein, may be embodied in various manners (e.g., as a method, a system, an AV, a computer program product, or a computer-readable storage medium). Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by one or more hardware processing units, e.g. one or more microprocessors, of one or more computers. In various embodiments, different steps and portions of the steps of each of the methods described herein may be performed by different processing units. Furthermore, aspects of the present disclosure may take the form of a computer program product embodied in one or more computer-readable medium(s), preferably non-transitory, having computer-readable program code embodied, e.g., stored, thereon. In various embodiments, such a computer program may, for example, be downloaded (updated) to the existing devices and systems (e.g. to the existing perception system devices and/or their controllers, etc.) or be stored upon manufacturing of these devices and systems.

The following detailed description presents various descriptions of specific certain embodiments. However, the innovations described herein can be embodied in a multitude of different ways, for example, as defined and covered by the claims and/or select examples. In the following description, reference is made to the drawings, in which like reference numerals can indicate identical or functionally similar elements. It will be understood that elements illustrated in the drawings are not necessarily drawn to scale. Moreover, it will be understood that certain embodiments can include more elements than illustrated in a drawing and/or a subset of the elements illustrated in a drawing. Further, some embodiments can incorporate any suitable combination of features from two or more drawings.

The following disclosure describes various illustrative embodiments and examples for implementing the features and functionality of the present disclosure. While particular components, arrangements, and/or features are described below in connection with various example embodiments, these are merely examples used to simplify the present disclosure and are not intended to be limiting. It will of course be appreciated that in the development of any actual embodiment, numerous implementation-specific decisions must be made to achieve the developer's specific goals, including compliance with system, business, and/or legal constraints, which may vary from one implementation to another. Moreover, it will be appreciated that, while such a development effort might be complex and time-consuming; it would nevertheless be a routine undertaking for those of ordinary skill in the art having the benefit of this disclosure.

In the drawings, a particular number and arrangement of structures and components are presented for illustrative purposes and any desired number or arrangement of such structures and components may be present in various embodiments. Further, the structures shown in the figures may take any suitable form or shape according to material properties, fabrication processes, and operating conditions. For convenience, if a collection of drawings designated with different letters are present (e.g., FIGS. 10A-10C), such a collection may be referred to herein without the letters (e.g., as "FIG. 10"). Similarly, if a collection of reference numerals designated with different letters are present (e.g., 110a-110e), such a collection may be referred to herein without the letters (e.g., as "110").

In the Specification, reference may be made to the spatial relationships between various components and to the spatial orientation of various aspects of components as depicted in the attached drawings. However, as will be recognized by those skilled in the art after a complete reading of the present disclosure, the devices, components, members, apparatuses, etc. described herein may be positioned in any desired orientation. Thus, the use of terms such as "above", "below", "upper", "lower", "top", "bottom", or other similar terms to describe a spatial relationship between various components or to describe the spatial orientation of aspects of such components, should be understood to describe a relative relationship between the components or a spatial orientation of aspects of such components, respectively, as the components described herein may be oriented in any desired direction. When used to describe a range of dimensions or other characteristics (e.g., time, pressure, temperature, length, width, etc.) of an element, operations, and/or conditions, the phrase "between X and Y" represents a range that includes X and Y. The terms "substantially," "close," "approximately," "near," and "about," generally refer to being within +/−20% of a target value (e.g., within +/−5 or 10% of a target value) based on the context of a particular value as described herein or as known in the art.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Other features and advantages of the disclosure will be apparent from the following description and the claims.

Example Environment for AV Rideshare Services Including VCS

FIG. 1 is a block diagram illustrating an environment 100 including an AV 110 that can be used to provide rideshare services, which may include delivery services as well as human passenger transportation services, to a user according to some embodiments of the present disclosure. In particular, the environment 100 may comprise a VCS, as will be described in greater detail below. The environment 100 includes an AV 110, a fleet management system 120, and a user device 130. The AV 110 may include a sensor suite 140, audio/video equipment 145, and an onboard computer 150. The fleet management system 120 may manage a fleet of AVs that are similar to AV 110; one or more of the other AVs in the fleet may also include a sensor suite and onboard computer. The fleet management system 120 may receive service requests for the AVs 110 from user devices 130. For example, a user 135 may make a request for rideshare service using an application, or "app," executing on the user device 130. The user device 130 may transmit the request directly to the fleet management system 120. In the case of a delivery service, the user device 130 may also transmit the request to a separate service (e.g., a service provided by a grocery store or restaurant) that coordinates with the fleet management system 120 to deliver orders to users. The fleet management system 120 dispatches the AV 110 to carry out the service requests. When the AV 110 arrives at a pickup location (i.e., the location at which user is to meet the AV to begin the rideshare service or to retrieve his or her delivery order), the user may be notified by the app to meet the AV.

The AV 110 is preferably a fully autonomous automobile, but may additionally or alternatively be any semi-autonomous or fully autonomous vehicle; e.g., a boat, an unmanned aerial vehicle, a self-driving car, etc. Additionally, or alternatively, the AV 110 may be a vehicle that switches between a semi-autonomous state and a fully autonomous state and thus, the AV may have attributes of both a semi-autonomous vehicle and a fully autonomous vehicle depending on the state of the vehicle.

The AV 110 may include a throttle interface that controls an engine throttle, motor speed (e.g., rotational speed of electric motor), or any other movement-enabling mechanism; a brake interface that controls brakes of the AV (or any other movement-retarding mechanism); and a steering interface that controls steering of the AV (e.g., by changing the angle of wheels of the AV). The AV 110 may additionally or alternatively include interfaces for control of any other vehicle functions, e.g., windshield wipers, headlights, turn indicators, air conditioning, etc.

The AV 110 includes a sensor suite 140, which may include a computer vision ("CV") system, localization sensors, and driving sensors. For example, the sensor suite 140 may include photodetectors, cameras, Radio Detection and Ranging (RADAR), Light Detection and Ranging (LIDAR), Sound Navigation and Ranging (SONAR), Global Positioning System (GPS), wheel speed sensors, inertial measurement units (IMUS), accelerometers, microphones, strain gauges, pressure monitors, barometers, thermometers, altimeters, etc. The sensors may be located in various positions in and around the AV 110. For example, the sensor suite 140 may include multiple cameras mounted at different positions on the AV 110, including within the main cabin for passengers and/or deliveries.

The AV 110 further includes audio/video equipment 145, which includes one or more displays, speakers, microphones, and cameras provided on an exterior of AV 110 (hereinafter "exterior audio/video equipment"), as well as in an interior of AV 110 (hereinafter "interior audio/video equipment"). In certain embodiments, one or more of the displays may include a HD video display for displaying HD video images, for purposes that will be described hereinbelow. Exterior audio/video equipment may include redundant equipment on both sides of AV. In particular, exterior audio/video equipment may be provided on or proximate AV doors on both sides of AV 110.

An onboard computer 150 may be connected to the sensor suite 140 and the audio/video equipment 145 and functions to control the AV 110 and to process sensed data from the sensor suite 140 and/or other sensors in order to determine the state of the AV 110. Based upon the vehicle state and programmed instructions, the onboard computer 150 modifies or controls behavior of the AV 110. In addition, the onboard computer 150 controls various aspects of the operation and functionality of audio/video equipment 145, including activating particular ones of the equipment as dictated by an application of VCS.

The onboard computer 150 is preferably a general-purpose computer adapted for I/O communication with vehicle control systems and sensor suite 140 but may additionally or alternatively be any suitable computing device. The onboard computer 150 is preferably connected to the Internet via a wireless connection (e.g., via a cellular data connection). Additionally or alternatively, the onboard computer 150 may be coupled to any number of wireless or wired communication systems. Aspects of the onboard computer 150 are described in greater detail with reference to FIG. 3.

The fleet management system 120 manages the fleet of AVs, including AV 110. The fleet management system 120 may manage one or more services that provide or use the AVs, e.g., a service for providing rides to users with the AVs, or a service that delivers items, such as prepared foods, groceries, or packages, using the AVs. The fleet management system 120 may select an AV from the fleet of AVs to perform a particular service or other task and instruct the selected AV to autonomously drive to a particular location (e.g., a designated pickup location) to pick up a user and/or drop off an order to a user. The fleet management system 120 may select a route for the AV 110 to follow. The fleet management system 120 may also manage fleet maintenance tasks, such as charging, servicing, and cleaning of the AV. As shown in FIG. 1, the AV 110 communicates with the fleet management system 120. The AV 110 and fleet management system 120 may connect over a public network, such as the Internet. The fleet management system 120 is described in greater detail with reference to FIG. 4.

Example AV for Use in Connection With VCS

Figure 2A:
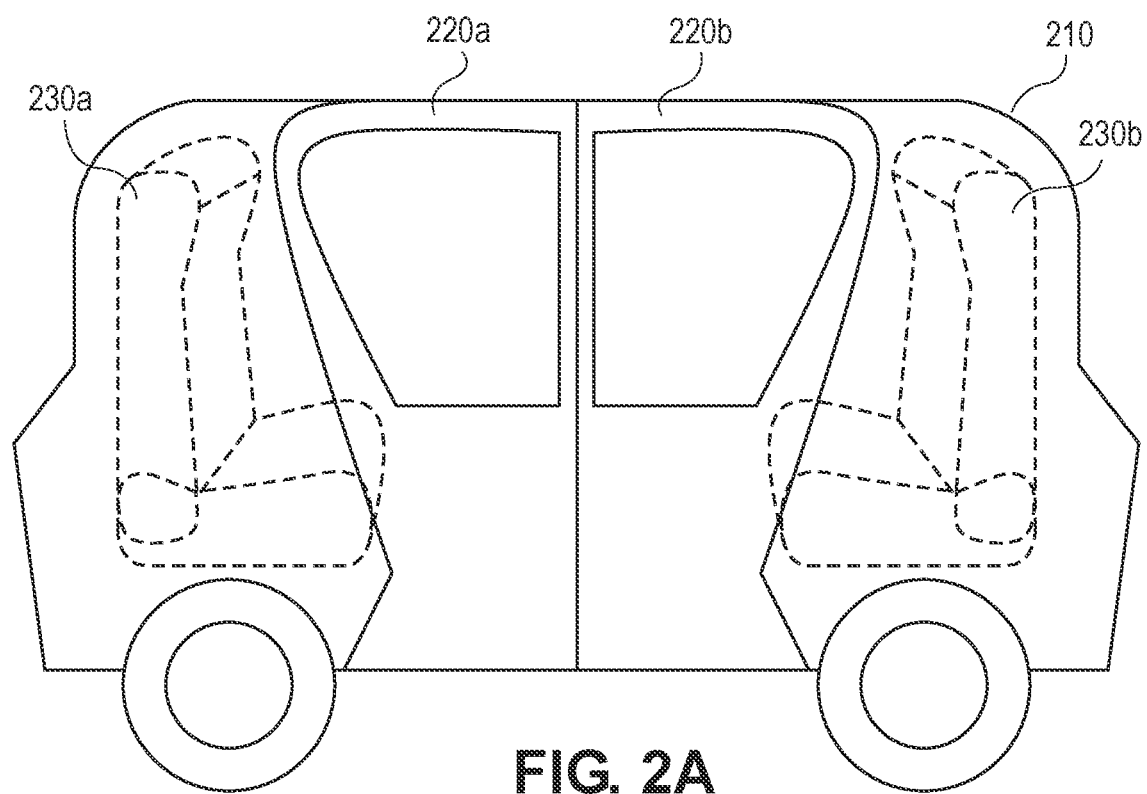
FIGS. 2A-2C illustrate an example AV that may include a VCS system according to some embodiments of the present disclosure.

FIG. 2A illustrates an example AV 210, which is an example of the AV 110 described with respect to FIG. 1. The AV 210 includes two outer doors 220a and 220b along one side of the AV 210. In some embodiments, the AV 210 includes two similar doors on the side of AV opposite the side that includes the doors 220a and 220b. The doors 220a, 220b, provide access to an interior cabin of the AV 210, which may be used for passenger seating. In the embodiment illustrated in FIG. 2, the interior cabin includes two rows of seats 230a and 230b. The two rows of seats 230a and 230b are arranged facing each other with a gap in between the rows of seats 230.

Figure 2B:
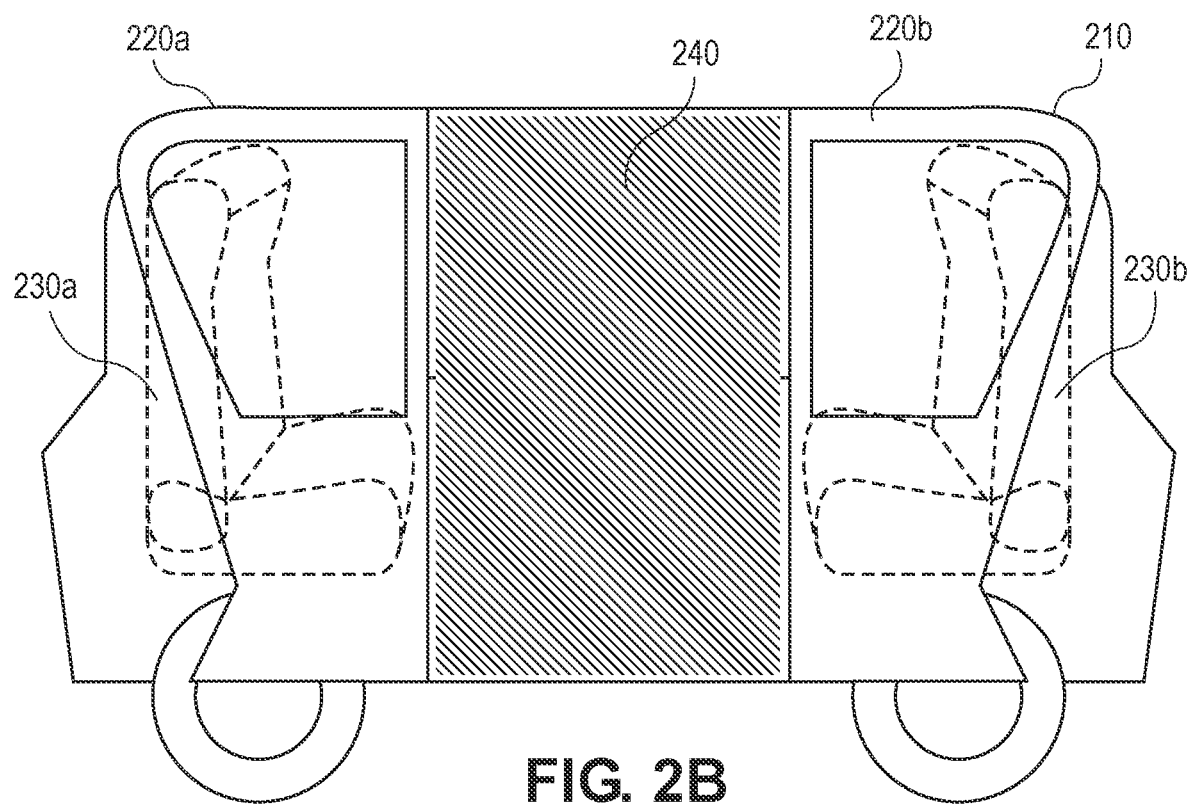

To provide access to a main cabin of the AV 210, the left door 220a slides towards the left and the right door 220b slides to the right. FIG. 2B illustrates the AV 210 with its doors 220a and 220b open to allow access to the main cabin. A shaded area 240 between the seats 230a and 230b corresponds to a portion of the main cabin that is available to transport delivery items. The interior cabin of the AV 210 includes the passenger seats 230 and the area 240 between the seats.

Figure 2C:
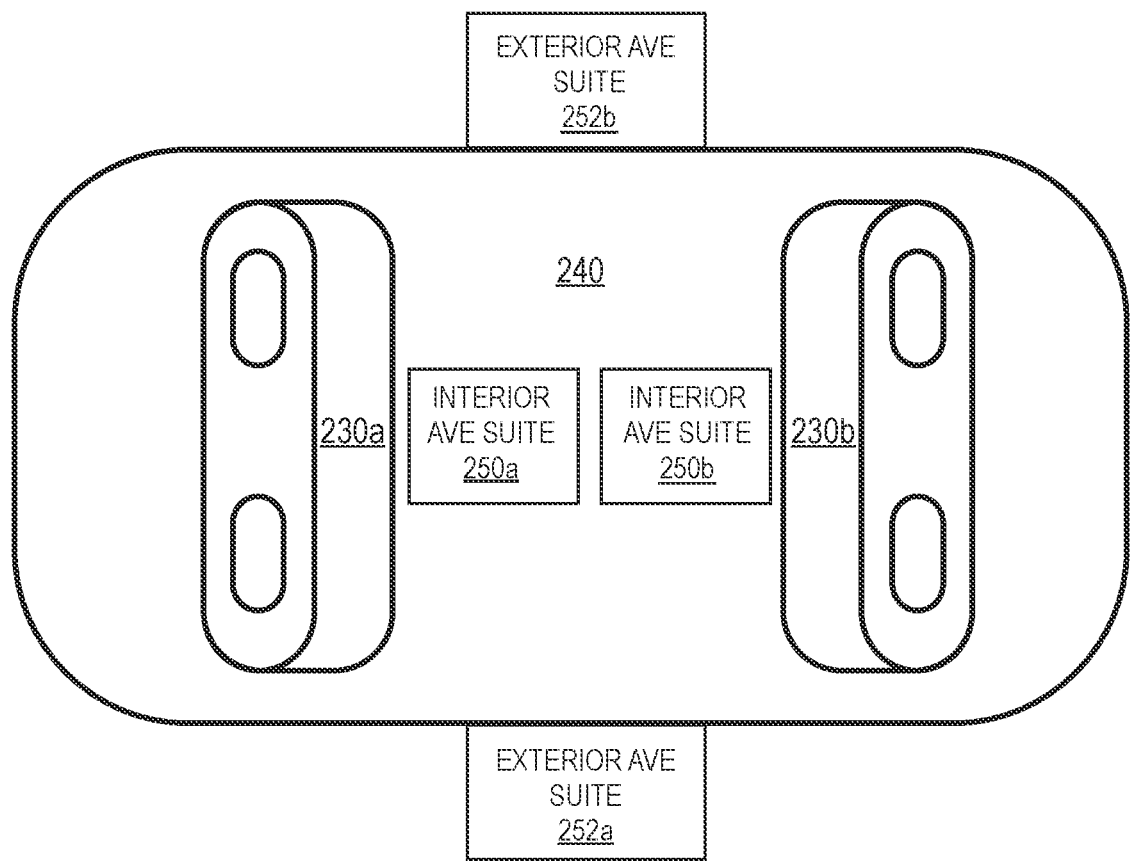

FIG. 2C illustrates an example "floor plan" of the AV 210 showing the area 240 between the seats 230a and 230b. In alternate embodiments, the AV 210 may have a different configuration, e.g., with seats in different positions, doors in different positions, doors opening in different ways, etc. As also shown in FIG. 2C, AV 210 includes several AVE suites, including interior AVE suites 250a, 250b, in an interior cabin of the AV 210, and exterior AVE suites 252a, 252b, on an exterior of the AV 210. AVEs 250, 252, are examples of the audio/video equipment 145 described with respect to FIG. 1. As illustrated in FIG. 2C, interior AVE suite 250a is located on one side of the interior cabin and may be associated with seat 230a, while interior AVE suite 250b is located on another side of the interior cabin and may be associated with seat 230b. As also shown in FIG. 2C, exterior AVE 252a is located on one side of the exterior of the AV 210, while exterior AVE suite 252b is located on the opposite side of the exterior of the AV 210. In accordance with features of embodiments described herein, each AVE suite 250, 252, may include at least one of each of a display for displaying images, including video, a set of speakers associated with the display, a camera for obtaining images, including video images, of a passenger inside the AV 210, and a microphone for recording audio associated with the images.

The equipment of each AVE suite 250, 252, is arranged in/on the AV in consideration of where users/passengers will be situated relative to/within the AV in a manner to maximize the quality of audio and video data obtained by and presented by the equipment (e.g., interior AVE suites 250 proximate and facing seats 230 and exterior AVEs 252 on and/or proximate doors 220 and directed outward from AV 210). Although two interior AVE suites 250 and two exterior AVE suites 252 are shown, it will be recognized that more or fewer AVE suites including more or fewer than one each of a display, a set of speakers, a camera, and a microphone, may be provided as desired or required for a particular application and/or as dictated by costs and/or other considerations.

Leaving the seats 230a and 230b in the AV 210 when the AV 210 is configured for delivery enables the fleet manager to switch the AV 210 between a passenger mode and a delivery mode more easily. Removing the seats 230a and 230b from the AV 210 may be cumbersome or may not be possible through the opening created by opening the doors 220a and 220b. Furthermore, repeated removal and reinstallation of the seats 230a and 230b may lead to increased wear and reduce their lifespan. In some cases, the seats 230a and 230b may be covered with a protective cover when the AV 210 is used for delivery.

Example Onboard Computer

Figure 3:
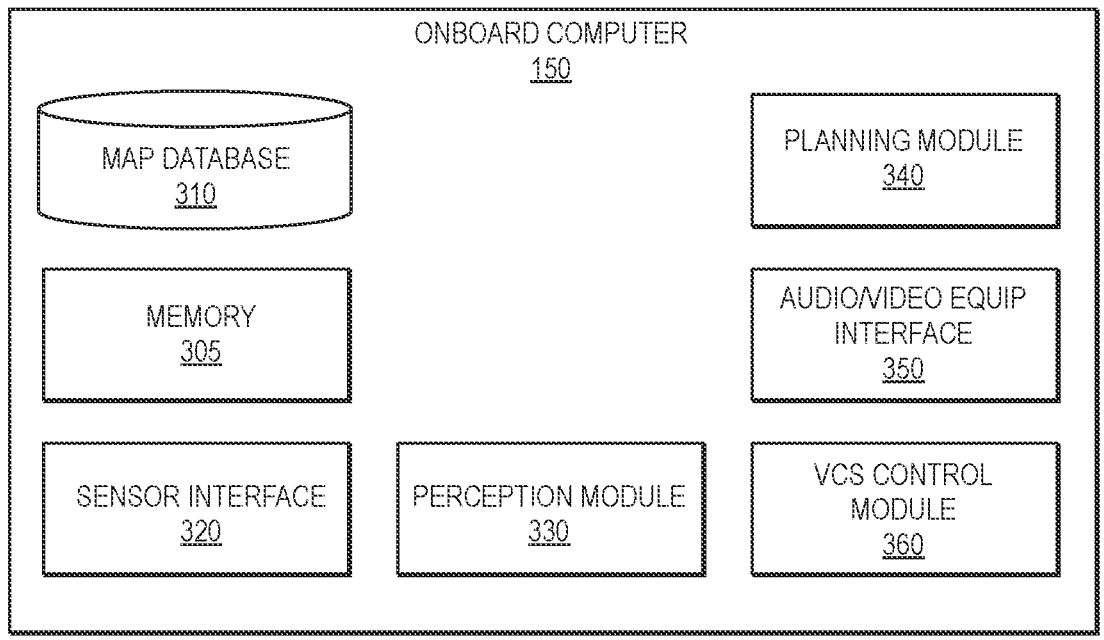
FIG. 3 is a block diagram illustrating an onboard computer for enabling aspects of an example VCS system for AV rideshare services according to some embodiments of the present disclosure.

FIG. 3 is a block diagram illustrating an onboard computer 150 for enabling features according to some embodiments of the present disclosure. The onboard computer 150 may include memory 305, a map database 310, a sensor interface 320, a perception module 330, a planning module 340, an audio/video equipment interface 350, and a VCS control module 360. In alternative configurations, fewer, different and/or additional components may be included in the onboard computer 150. For example, components and modules for controlling movements of the AV 110 and other vehicle functions, and components and modules for communicating with other systems, such as the fleet management system 120 and exterior video conferencing systems, are not shown in FIG. 3. Further, functionality attributed to one component of the onboard computer 150 may be accomplished by a different component included in the onboard computer 150 or a different system from those illustrated.

The map database 310 stores a detailed map that includes a current environment of the AV 110. The map database 310 includes data describing roadways (e.g., locations of roadways, connections between roadways, roadway names, speed limits, traffic flow regulations, toll information, etc.) and data describing buildings (e.g., locations of buildings, building geometry, building types). The map database 310 may further include data describing other features, such as bike lanes, sidewalks, crosswalks, traffic lights, parking lots, etc.

The sensor interface 320 interfaces with the sensors in the sensor suite 140. The sensor interface 320 may request data from the sensor suite 140, e.g., by requesting that a sensor capture data in a particular direction or at a particular time. The sensor interface 320 is configured to receive data captured by sensors of the sensor suite 140. The sensor interface 320 may have subcomponents for interfacing with individual sensors or groups of sensors of the sensor suite 140, such as a thermal sensor interface, a camera interface, a lidar interface, a radar interface, a microphone interface, etc.

The perception module 330 identifies objects in the environment of the AV 110. The sensor suite 140 produces a data set that is processed by the perception module 330 to detect other cars, pedestrians, trees, bicycles, and objects traveling on or near a road on which the AV 110 is traveling or stopped, and indications surrounding the AV 110 (such as construction signs, traffic cones, traffic lights, stop indicators, and other street signs). For example, the data set from the sensor suite 140 may include images obtained by cameras, point clouds obtained by LIDAR sensors, and data collected by RADAR sensors. The perception module 330 may include one or more classifiers trained using machine learning to identify particular objects. For example, a multi-class classifier may be used to classify each object in the environment of the AV 110 as one of a set of potential objects, e.g., a vehicle, a pedestrian, or a cyclist. As another example, a human classifier recognizes humans in the environment of the AV 110, a vehicle classifier recognizes vehicles in the environment of the AV 110, etc.

The planning module 340 plans maneuvers for the AV 110 based on map data retrieved from the map database 310, data received from the perception module 330, and navigation information, e.g., a route instructed by the fleet management system 120. In some embodiments, the planning module 340 receives map data from the map database 310 describing known, relatively fixed features and objects in the environment of the AV 110. For example, the map data includes data describing roads as well as buildings, bus stations, trees, fences, sidewalks, etc. The planning module 340 receives data from the perception module 330 describing at least some of the features described by the map data in the environment of the AV 110. The planning module 340 determines a pathway for the AV 110 to follow. The pathway includes locations for the AV 110 to maneuver to, and timing and/or speed of the AV 110 in maneuvering to the locations.

The audio/video equipment interface 350 interfaces with the audio/video equipment 145. The interface 350 may request data from the sensor suite audio/video equipment 145, e.g., by requesting that a camera capture data in a particular direction or at a particular time in order to capture an image of a particular person (e.g., a user, passenger, or third party) and/or by requesting a video conferencing session be moved from exterior equipment to interior equipment or vice versa. The audio/video equipment interface 350 is configured to receive data captured by individual components of the audio/video equipment 145, as well as to provide data to those components. The audio/video equipment interface 350 may have subcomponents for interfacing with individual components or groups of components of the audio/video equipment 145, such as a display, a set of speakers, a camera, a microphone, etc.

The VCS control module 360 interacts with the audio/video equipment interface 350 to control and provide various aspects of the VCS functionality described herein, including but not limited to features as described below with reference to FIGS. 5-8.

Example Fleet Management System

Figure 4:
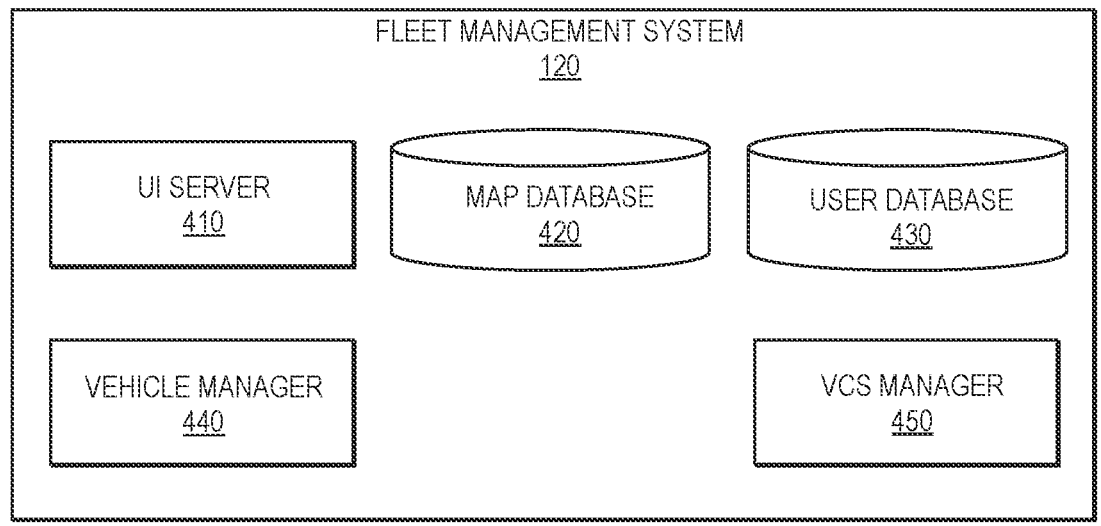
FIG. 4 is a block diagram of a fleet management system for enabling aspects of an example VCS for AV rideshare services according to some embodiments of the present disclosure.

FIG. 4 is a block diagram illustrating the fleet management system 120 according to some embodiments of the present disclosure. The fleet management system 120 includes a UI server 410, a map database 420, a user database 430, a vehicle manager 440, and a VCS manager 450. In alternative configurations, different, additional, or fewer components may be included in the fleet management system 120. Further, functionality attributed to one component of the fleet management system 120 may be accomplished by a different component included in the fleet management system 120 or a different system than those illustrated.

The UI server 410 is configured to communicate with client devices that provide a user interface to users. For example, the UI server 410 may be a web server that provides a browser-based application to client devices, or the UI server 410 may be a user app server that interfaces with a user app installed on client devices, such as the user device 130. The UI enables the user to access a service of the fleet management system 120, e.g., to request a ride from an AV 110, or to request a delivery from an AV 110. For example, the UI server 410 receives a request for a ride that includes an origin location (e.g., the user's current location) and a destination location, or a request for a delivery that includes a pickup location (e.g., a local restaurant) and a destination location (e.g., the user's home address). In accordance with features of embodiments described herein, UI server 410 may communicate information to a user regarding various aspects of the VCS functionality, including but not limited to supporting functionality for initiating features of VCS functionality as described below with reference to FIGS. 5-8.

The map database 420 stores a detailed map describing roads and other areas (e.g., parking lots, AV service facilities) traversed by the fleet of AVs 110. The map database 420 includes data describing roadways (e.g., locations of roadways, connections between roadways, roadway names, speed limits, traffic flow regulations, toll information, etc.), data describing buildings (e.g., locations of buildings, building geometry, building types), and data describing other objects (e.g., location, geometry, object type), and data describing other features, such as bike lanes, sidewalks, crosswalks, traffic lights, parking lots, etc. At least a portion of the data stored in the map database 420 is provided to the AVs 110 as a map database 310, described above.

The user database 430 stores data describing users of the fleet of AVs 110. Users may create accounts with the fleet management system 120, which stores user information associated with the user accounts, or user profiles, in the user database 430. The user information may include identifying information (name, user name), password, payment information, home address, contact information (e.g., email and telephone number), and information for verifying the user (e.g., photograph, driver's license number). Users may provide some or all of the user information, including user preferences regarding certain aspects of services provided by the rideshare system, to the fleet management system 120. In some embodiments, the fleet management system 120 may infer some user information from usage data or obtain user information from other sources, such as public databases or licensed data sources.

The fleet management system 120 may learn one or more home addresses for a user based on various data sources and user interactions. The user may provide a home address when setting up his account, e.g., the user may input a home address, or the user may provide an address in conjunction with credit card information. In some cases, the user may have more than one home, or the user may not provide a home address, or the user-provided home address may not be correct (e.g., if the user moves and the home address is out of date, or if the user's address associated with the credit card information is not the user's home address). In such cases, the fleet management system 120 may obtain a home address from one or more alternate sources. In one example, the fleet management system 120 obtains an address associated with an official record related to a user, such as a record from a state licensing agency (e.g., an address on the user's driver's license), an address from the postal service, an address associated with a phone record, or other publicly available or licensed records. In another example, the fleet management system 120 infers a home address based on the user's use of a service provided by the fleet management system 120. For example, the fleet management system 120 identifies an address associated with at least a threshold number of previous rides provided to a user (e.g., at least 10 rides, at least 50% of rides, or a plurality of rides), or at least a threshold number of previous deliveries (e.g., at least five deliveries, at least 60% of deliveries) as a home address or candidate home address. The fleet management system 120 may look up a candidate home address in the map database 420 to determine if the candidate home address is associated with a residential building type, e.g., a single-family home, a condominium, or an apartment. The fleet management system 120 stores the identified home address in the user database 430. The fleet management system 120 may obtain or identify multiple addresses for a user and associate each address with the user in the user database 430. In some embodiments, the fleet management system 120 identifies a current home address from multiple candidate home addresses, e.g., the most recent address, or an address that the user rides to or from most frequently and flags the identified current home address in the user database 430.

The vehicle manager 440 directs the movements of the AVs 110 in the fleet. The vehicle manager 440 receives service requests from users from the UI server 410, and the vehicle manager 440 assigns service requests to individual AVs 110. For example, in response to a user request for transportation from an origin location to a destination location, the vehicle manager 440 selects an AV and instructs the AV to drive to the origin location (e.g., a passenger or delivery pickup location), and then instructs the AV to drive to the destination location (e.g., the passenger or delivery destination location). In addition, the vehicle manager 440 may instruct AVs 110 to drive to other locations while not servicing a user, e.g., to improve geographic distribution of the fleet, to anticipate demand at particular locations, to drive to a charging station for charging, etc. The vehicle manager 440 also instructs AVs 110 to return to AV facilities for recharging, maintenance, or storage.

The VCS manager 450 manages various aspects of VCS functionality with respect to a fleet of AVs, including but not limited to various features as described below with reference to FIGS. 5-8.

Example Methods for VCS Implementation and Operation

FIGS. 5-8 are flowcharts illustrating example processes for a VCS for an AV rideshare service according to some embodiments of the present disclosure. One or more of the steps illustrated in FIGS. 5-8 may be executed by one or more of the elements shown in FIGS. 3 and 4.

Figure 5:
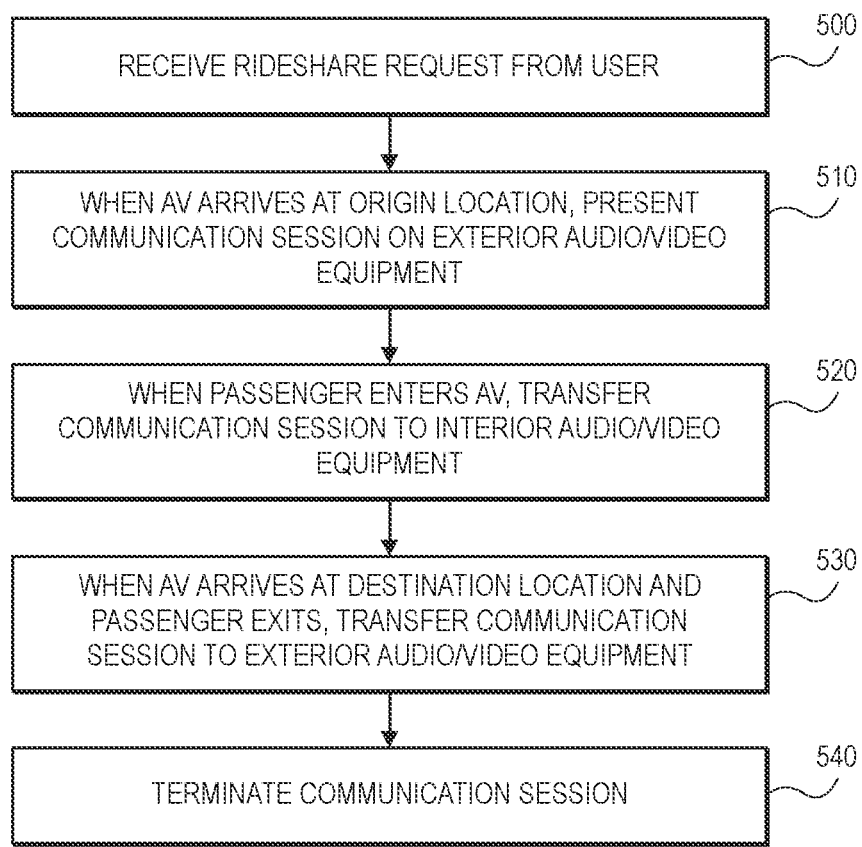
FIGS. 5-8 are flowcharts illustrating example processes of a VCS for AV rideshare services according to some embodiments of the present disclosure.

FIG. 5 is a flowchart illustrating an example operation of the VCS for welcoming a passenger using video conferencing and/or presenting an AV identifier to the passenger.

In step 500, a rideshare request is received from a user. The rideshare request may be submitted by the user using the user app and designates an origin (or pickup) location and a destination location for the rideshare request. An AV is dispatched to the origin location in response to the request.

In step 510, when the dispatched AV arrives at the origin location, a communication session is presented using one of the exterior AVE suites of the AV. It will be recognized that the AV will "know" which side of the AV the passenger will likely be entering (i.e., typically from the sidewalk facing side of the AV rather than the street-facing side of the AV) and will present the communication session using the appropriate one of the exterior AVE suites. Alternatively, the communication session may be presented on both or all exterior AVE suites. In certain embodiments, the communication session is a live video conferencing session, in which case it is possible or likely that the third party with whom the passenger is communicating is the user who requested the ride. In this embodiment, the communication session may also serve as a vehicle identifier for the passenger (e.g., through presentation of a familiar face on the display of the exterior AVE suite). In alternative embodiments, the communication session is a vehicle identifier other than a live video conferencing session, in which case the communication session may include presentation of a recorded video (e.g., recorded by the user for the passenger) or an image or avatar selected by the passenger (e.g., via the passenger's user app) to identify the AV as the correct one.

[OM] In step 520, when the passenger enters the AV, the communication session may be transferred from the exterior AVE suite to an interior AVE suite. Assuming the AV includes multiple seats and multiple interior AVE suites, selection of the appropriate AVE suite to which to transfer the communication session may be made using sensors to determine in which seat the passenger is seated. It will be recognized that in situations in which the image or video presented using the exterior AVE suite is for identification purposes only, the communication session will not be transferred to an interior AVE suite and will terminate automatically, for example, when the passenger enters the AV.

In step 530, when the AV arrives at the destination location and the passenger exits the AV, the communication session may again be transferred to an exterior AVE suite, which may be selected based on the side of the AV from which the passenger exits, if the communication session has not already been terminated. This may provide the user the opportunity to bid farewell to the passenger as he or she heads to her final destination on foot.

In step 540, if the communication session is terminated. Termination may be automatic (e.g., the sensor suite detects that the passenger has turned away from the car or has moved a predetermined distance away from the AV) or may be initiated by one of the participants in the communication session.

Figure 6:
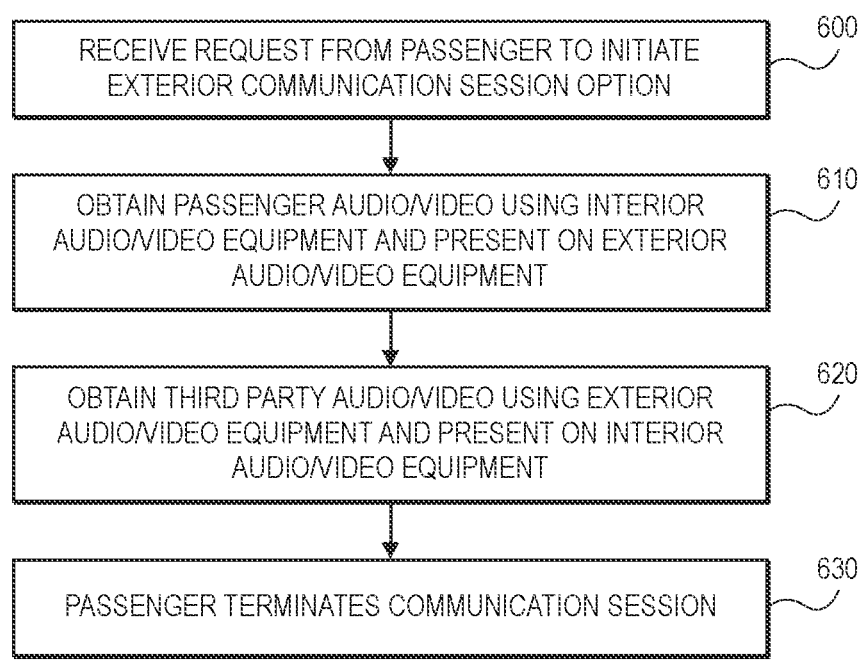

FIG. 6 is a flowchart illustrating an example operation of the VCS for enabling a passenger in an AV to communicate with a third party outside the AV.

In step 600, a request is received from a passenger in an AV to initiate an external communication session option. The request may be made by the passenger using the user app on the passenger's user device. Alternatively, the request may be made using a device provided within the AV itself (e.g., a version of the user app presented on a touchscreen display).

In step 610, passenger audio/video is captured using an interior AVE suite of the AV. In particular, one or more cameras and microphones are used to capture real time video images and audio of the passenger, which video and audio is presented using one or more of the exterior AVE suites of the AV.

In step 620, external audio/video is captured using an exterior AVE suite of the AV. In particular, one or more cameras and microphones are used to capture real time video images and audio of a third party outside the AV, which video and audio is presented using one or more of the interior AVE suites of the AV.

In certain embodiments, steps 610 and 620 occur substantially simultaneously, to enable a conversation between the passenger within the AV and a third party outside the AV. Additionally and/or alternatively, the passenger may elect not to have his or her audio and/or video presented on the exterior AVE suite, opting only to receive audio and/or video from the exterior AVE suite to be presented on the interior AVE suite. Still further, the passenger may select which of multiple AVE suites to be used throughout the communication session.

In step 630, the communication session is terminated. As described above with reference to FIG. 5, termination of the communication session may occur automatically or may be initiated by the passenger.

Figure 7:
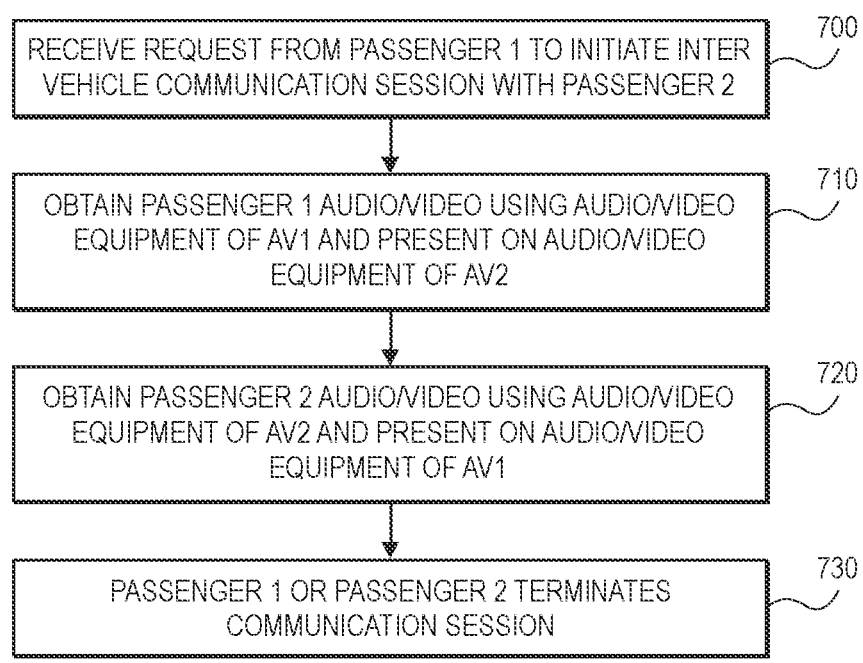

FIG. 7 is a flowchart illustrating an example operation of the VCS for enabling intervehicle communication; i.e., communication between passengers in different AVs of an AV fleet.

In step 700, a request is received from a passenger (PASSENGER 1) in one AV of an AV fleet (AV1) to initiate a communication session with another passenger (PASSENGER 2) in another AV of the AV fleet (AV2). The request may be made by the passenger using the user app on PASSENGER 1's user device. Alternatively, the request may be made using a device provided within AV1 itself (e.g., a version of the user app presented on a touchscreen display). It will be recognized that fleet management system 122 will be aware of AVs that have been dispatched for/assigned to both passengers.

In step 710, audio/video of PASSENGER 1 is captured using an interior AVE suite of AV1. In particular, one or more cameras and microphones of interior AVE suite of AV1 are used to capture real time video images and audio of PASSENGER 1, which video and audio is presented to PASSENGER 2 using an interior AVE suite of AV2.

In step 720, audio/video of PASSENGER 2 is captured using an interior AVE suite of AV2. In particular, one or more cameras and microphones of interior AVE suite of AV2 are used to capture real time video images and audio of PASSENGER 2, which video and audio is presented to PASSENGER 1 using an interior AVE suite of AV1.

In certain embodiments, steps 710 and 720 occur substantially simultaneously, to enable a real time video conferencing conversation between PASSENGER 1 and PASSENGER 2.

In step 730, PASSENGER 1 or PASSENGER 2 terminates the communication session. Alternatively, as described above with reference to FIG. 5, termination of the communication session may occur automatically (e.g., when one or both of the passengers exit their respective AVs).

It will be recognized that in steps 710 and 720, exterior AVE suites of one or both AV1 and AV2 may also be used, with the communication session being transferred between interior and exterior AVE suites of the AV to enable seamless transition of the communication session as the passengers enter and exit their respective AVs. For example, in one scenario, PASSENGER 1 may initiate a communication session with PASSENGER 2 while PASSENGER 1 is in AV1 and after AV2 has been dispatched but before PASSENGER 2 has entered AV2. In this scenario, the communication session may commence using an interior AVE suite of AV1 and an exterior AVE suite of AV2. Once PASSENGER 2 has entered AV2, the communication session may be transferred from exterior AVE suite of AV2 to interior AVE suite of AV2. Assume further that AV1 arrives at PASSENGER 1's destination while PASSENGER 2 is still en route in AV2. Unless one of the passengers terminates the communication session, the communication session could once again be transferred from interior AVE suite of AV1 to exterior AVE suite of AV1 when PASSENGER 1 exits AV1. In this case, termination may occur automatically as described above with reference to FIG. 5 (e.g., once PASSENGER 1 turns away from AV1 or proceeds a predetermined distance from AV1, as determined using sensor suite of AV1).

Although the intervehicle communication session shown in FIG. 7 has been described with reference to two passengers, it will be recognized that more than two passengers may be added to and participate in the intervehicle communication session without departing from the spirit or scope of the embodiments described.

Figure 8:
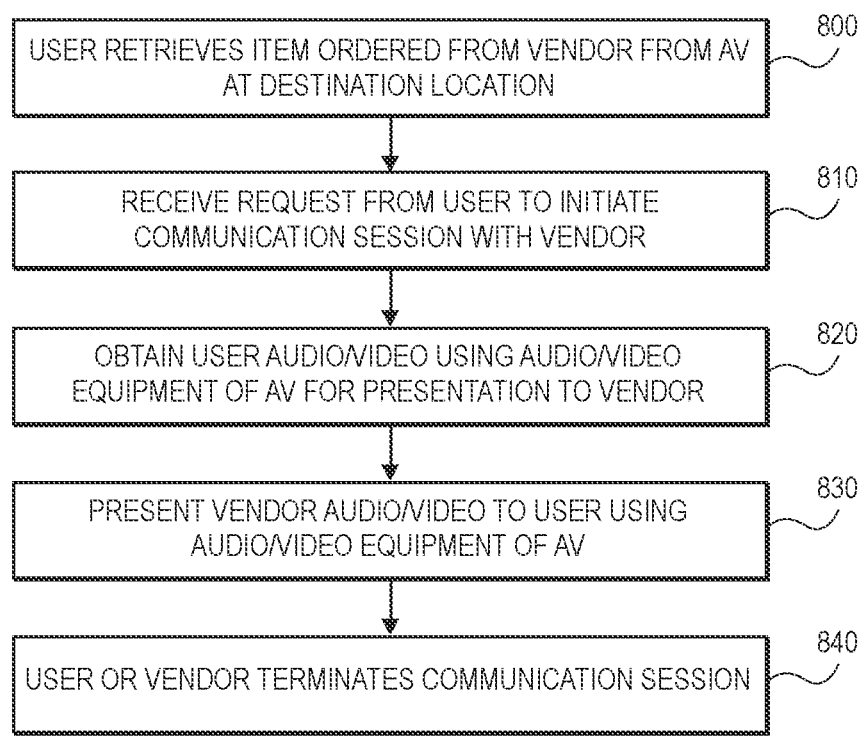

FIG. 8 is a flowchart illustrating an example operation of the VCS for enabling communication between a user and a vendor of a delivered item using audio/video equipment of the delivery AV.

In step 800, a user retrieves from an AV an item he or she has ordered from a vendor and that has been delivered by the AV to a destination location specified by the user.

In step 810, the user initiates a communication session with the vendor either using a user app the user's device or using a device provided for this purpose on the exterior of the AV and associated with an exterior AVE suite of the AV. In either case, a link or button may be provided for this purpose, with initiation of the communication session commencing responsive to selection of the link or button.

In step 820, audio/video of the user is captured using the exterior AVE suite of the AV. In particular, one or more cameras and microphones of exterior AVE suite of the AV are used to capture real time video images and audio of the user, which video and audio is presented to vendor on the vendor's app (using web conferencing techniques, for example).

In step 830, audio/video of the vendor (which may be captured using a camera and microphone provided on a device of the vendor on which the vendor's app is installed) is presented to the user using the exterior AVE suite of the AV.

In certain embodiments, steps 810 and 820 occur substantially simultaneously, to enable a real time video conferencing conversation between the user and the vendor.

In step 840 (e.g., presumably after the issue that caused the user to initiate contact with the vendor has been resolved), the user or the vendor terminates the communication session.

Although the operations of the example method shown in FIGS. 5-8 are illustrated as occurring once each and in a particular order, it will be recognized that the operations may be performed in any suitable order and repeated as desired. Additionally, one or more operations may be performed in parallel. Furthermore, the operations illustrated in FIGS. 5-8 may be combined or may include more or fewer details than described.

Moreover, operations described as being initiated or performed using a user app installed on a user's device may also be initiated or performed using a device provided in connection with the AVE suites (e.g., a touchscreen or panel installed in or on the AV), referred to herein as an AV UI device. It will be recognized that the user/passenger may control various operations of and interact with the VCS using the user app or the AV UI device. Such operations may include but are not limited to selectively controlling operation of interior and exterior audio/video equipment (e.g., controlling the volume of the speakers, muting the microphone, turning cameras and displays on or off, etc.), initiating features described hereinabove in FIGS. 5-8, and terminating features described above with reference to FIGS. 5-8.

SELECT EXAMPLES

Example 1 provides a method including conducting at least a portion of a video communication session involving a passenger using at least one exterior audio/video component on an exterior surface of a vehicle dispatched to a designated location; and transferring the video communication session to at least one interior audio/video component on an interior of the vehicle.

Example 2 provides the method of example 1, where the video communication session includes a live video conference between the passenger and a third party user.

Example 3 provides the method of example 2, where the video communication session is initiated by the third party user.

Example 4 provides the method of example 2, where the video communication session is initiated by the passenger.

Example 5 provides the method of any of examples 1-4, where the at least one exterior audio/video component includes a display and speakers.

Example 6 provides the method of example 5, where the display includes a HD display.

Example 7 provides the method of example 5, further including using the display to present a video portion of the video communication session to the passenger and using the speakers to present an audio portion of the video communication session to the passenger.

Example 8 provides the method of example 7, where the video portion of the video communication session includes video of a remote third party user and the audio portion of the video communication session includes audio of the remote third party user.

Example 9 provides the method of any of examples 1-4, where the at least one exterior audio/video component includes a camera and a microphone.

Example 10 provides the method of example 9, further including using the camera to capture a video portion of the video communication session and using the microphone to capture an audio portion of the video communication session.

Example 11 provides the method of example 10, where the video portion of the video communication session includes video of the passenger and the audio portion of the video communication session includes audio of the passenger.

Example 12 provides the method of any of examples 1-4, where the at least one interior audio/video component includes a display and speakers.

Example 13 provides the method of example 12, further including using the display to present a video portion of the video communication session to the passenger and using the speakers to present an audio portion of the video communication session to the passenger.

Example 14 provides the method of example 13, where the video portion of the video communication session includes video of a remote third party user and the audio portion of the video communication session includes audio of the remote third party user.

Example 15 provides the method of any of examples 1-4, where the at least one interior audio/video component includes a camera and a microphone.

Example 16 provides the method of example 15, further including using the camera to capture a video portion of the video communication session and using the microphone to capture an audio portion of the video communication session.

Example 17 provides the method of example 16, where the video portion of the video communication session includes video of the passenger and the audio portion of the video communication session includes audio of the passenger.

Example 18 provides the method of any of example 1-4, where the vehicle is an AV.

Example 19 provides the method of any of examples 1-4, where the video communication session includes a one-way communication session including a video portion for presentation to the passenger using a HD display on an exterior surface of the vehicle.

Example 20 provides the method of example 19, where the video communication session includes an audio portion for presentation to the passenger using speakers on the vehicle.

Example 21 provides the method of example 19, where the video portion includes a prerecorded video.

Example 22 provides the method of example 19, where the video portion includes at least one still image.

Example 23 provides the method of any of examples 2-4, further including the passenger terminating the video communication session.

Example 24 provides the method of any of examples 2-4, further including the third party user terminating the video communication session.

Example 25 provides a method including conducting a video communication session between a user and a third party using a plurality of onboard audio/video components provided on an AV dispatched to provide a rideshare service to the user; where the conducting further includes presenting to the user at least one of a first video portion of the video communication session and a first audio portion of the video communication session using a first one of the onboard audio/video components; and capturing at least one of a second video portion of the video communication session and a second audio portion of the video communication session using a second one of the onboard audio/video components, where the second video portion includes a video of the user and the second audio portion includes audio of the user.

Example 26 provides the method of example 25, where at least one of the onboard audio/video components includes at least one of a display, a speaker, a camera, and a microphone.

Example 27 provides the method of any of examples 25-26, where at least one of the onboard audio/video components includes an interior onboard audio/video component provided in an interior of the AV.

Example 28 provides the method of any of examples 25-26, where the at least one of the onboard audio/video components includes an exterior onboard audio/video component provided on an exterior of the AV.

Example 29 provides the method of any of examples 25-26, where the conducting further includes capturing at least one of the first video portion of the video communication session and the first audio portion of the video communication session using a third one of the onboard audio/video components.

Example 30 provides the method of any of examples 25-26, where the conducting further includes presenting to the third party at least one of the second video portion and the second audio using a third one of the onboard audio/video components.

Example 31 provides the method of example 30, where the third onboard audio/video component includes a HD display on an exterior of the AV.

Example 32 provides the method of any of examples 25-26, where the third party is a passenger in a second AV, the conducting further including presenting to the third party at least one of the second video portion and the second audio using an onboard audio/video component of the second AV.

Example 33 provides the method of example 32, where the conducting further includes capturing at least one of the first video portion of the video communication session and the first audio portion of the video communication session using a second onboard audio/video component of the second AV.

Example 34 provides a VCS for an AV for providing rideshare services, the VCS including an exterior AVE suite on an exterior of the AV; an interior AVE suite in an interior of the AV; and a VCS control module for using at least one of the exterior AVE suite and the interior AVE suite to conduct at least a portion of a video communication session involving a user.

Example 35 provides the VCS of example 34, where the exterior AVE suite includes at least one of a display, a speaker, a camera, and a microphone.

Example 36 provides the VCS of example 34, where the interior AVE suite includes at least one of a display, a speaker, a camera, and a microphone.

Example 37 provides the VCS of at least one of examples 34-36, where operation of components of at least one of the interior AVE suite and the exterior AVE suite is controlled by the user using a user app.

Example 38 provides the VCS of example 37, where the user app is displayed on a device of the user.

Example 39 provides the VCS of example 37, where the user app is displayed on a device having a touchscreen and provided in the AV.

Example 40 provides the VCS of any of examples 34-36, where the AV includes a fleet of AVs interconnected by a fleet management system.

Example 41 provides a method including conducting a video communication session between a user and a third party using a plurality of onboard audio/video components provided on an AV dispatched to deliver an item to the user at a delivery location; where the conducting further includes, subsequent to arrival of the AV to the delivery location, presenting to the user an option to initiate the video communication session using a UI presented on at least one of a mobile device of the user and a device provided on the AV; presenting to the user at least one of a first video portion of the video communication session and a first audio portion of the video communication session using a first one of the onboard audio/video components, where the first video portion includes a video of the third party and the first audio portion includes audio of the third party, where at least one of the onboard audio/video components includes at least one of a display and a speaker.

Example 42 provides the method of example 41, where the conducting further includes capturing for presentation to the third party at least one of a second video portion of the video communication session and a second audio portion of the video communication session using a second one of the onboard audio/video components, where the second video portion includes a video of the user and the second audio portion includes audio of the user, where at least one of the onboard audio/video components includes at least one of a camera and a microphone.

Example 43 provides the method of any of examples 41-42, where the third party includes a vendor of the item.

Example 44 provides the method of any of examples 41-43, where the conducting further includes, subsequent to the presenting to the user the option to initiate the video communication session, receiving from the user a request to initiate the video communication system using the UI.

Example 45 provides the method of example 44, where the presenting to the user at least one of a first video portion of the video communication session and a first audio portion of the video communication session commences subsequent to the receiving.

Other Implementation Notes, Variations, and Applications

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

In one example embodiment, any number of electrical circuits of the figures may be implemented on a board of an associated electronic device. The board can be a general circuit board that can hold various components of the interior electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements, etc. can be suitably coupled to the board based on particular configuration needs, processing demands, computer designs, etc. Other components such as exterior storage, additional sensors, controllers for audio/video display, and peripheral devices may be attached to the board as plug-in cards, via cables, or integrated into the board itself. In various embodiments, the functionalities described herein may be implemented in emulation form as software or firmware running within one or more configurable (e.g., programmable) elements arranged in a structure that supports these functions. The software or firmware providing the emulation may be provided on non-transitory computer-readable storage medium comprising instructions to allow a processor to carry out those functionalities.

It is also imperative to note that all of the specifications, dimensions, and relationships outlined herein (e.g., the number of processors, logic operations, etc.) have only been offered for purposes of example and teaching only. Such information may be varied considerably without departing from the spirit of the present disclosure, or the scope of the appended examples. The specifications apply only to one non-limiting example and, accordingly, they should be construed as such. In the foregoing description, example embodiments have been described with reference to particular arrangements of components. Various modifications and changes may be made to such embodiments without departing from the scope of the appended examples. The description and drawings are, accordingly, to be regarded in an illustrative rather than in a restrictive sense.

Note that with the numerous examples provided herein, interaction may be described in terms of two, three, four, or more components; however, this has been done for purposes of clarity and example only. It should be appreciated that the system can be consolidated in any suitable manner. Along similar design alternatives, any of the illustrated components, modules, and elements of the FIGS. may be combined in various possible configurations, all of which are clearly within the broad scope of this Specification.

Various operations may be described as multiple discrete actions or operations in turn in a manner that is most helpful in understanding the example subject matter. However, the order of description should not be construed as to imply that these operations are necessarily order dependent. In particular, these operations may not be performed in the order of presentation. Operations described may be performed in a different order from the described embodiment. Various additional operations may be performed, and/or described operations may be omitted in additional embodiments.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended examples. Note that all optional features of the systems and methods described above may also be implemented with respect to the methods or systems described herein and specifics in the examples may be used anywhere in one or more embodiments.

In order to assist the United States Patent and Trademark Office (USPTO) and, additionally, any readers of any patent issued on this application in interpreting the examples appended hereto, Applicant wishes to note that the Applicant: (a) does not intend any of the appended examples to invoke paragraph (f) of 35 U.S.C. Section 112 as it exists on the date of the filing hereof unless the words "means for" or "step for" are specifically used in the particular examples; and (b) does not intend, by any statement in the Specification, to limit this disclosure in any way that is not otherwise reflected in the appended examples.

What is claimed is:

1. A method comprising:
    conducting a video communication session between a first user associated with a first vehicle of a rideshare services fleet and a second user associated with a second vehicle of the rideshare services fleet using a plurality of onboard audio/video components provided on the first and second vehicles, the conducting further comprising:
        presenting to the first user a first video portion of the video communication session and a first audio portion of the video communication session using at least a first one of the onboard audio/video components of the first vehicle installed on an interior of the first vehicle;
        capturing a second video portion of the video communication session and a second audio portion of the video communication session using at least a second one of the onboard audio/video components of the first vehicle installed on the interior of the first vehicle, wherein the second video portion comprises a video of the first user and the second audio portion comprises audio of the first user; and
        presenting to the second user the second video portion and the second audio using at least a first one of the onboard audio/video components of the second vehicle installed on an exterior of the second vehicle; and
        capturing the first video portion of the video communication session and the first audio portion of the video communication session using at least a second one of the onboard audio/video components of the second vehicle installed on the interior of the second vehicle, wherein the first video portion comprises a video of the second user and the first audio portion comprises audio of the second user.

2. The method of claim 1, wherein the second video portion comprises a video of the first user and the second audio portion comprises audio of the first user.

3. The method of claim 1, wherein the first and second vehicles comprise autonomous vehicles.

4. The method of claim 1, wherein at least one of the onboard audio/video components of the first and second vehicles comprises at least one of a display, a speaker, a camera, and a microphone.

5. The method of claim 1, wherein at least one of the onboard audio/video components of the first and second vehicles comprises an interior onboard audio/video component provided in interiors of the vehicles.

6. A method comprising:
    conducting a video communication session between a user and a third party using a plurality of onboard audio/video components provided on a vehicle dispatched to provide a rideshare service to the user; wherein the conducting further comprises:
- presenting to the user at least one of a first video portion of the video communication session and a first audio portion of the video communication session using a first one of the onboard audio/video components; and
- capturing at least one of a second video portion of the video communication session and a second audio portion of the video communication session using a second one of the onboard audio/video components, wherein the second video portion comprises a video of the user and the second audio portion comprises audio of the user;
- wherein the conducting further comprises presenting to the third party at least one of the second video portion and the second audio using a third one of the onboard audio/video components; and
- wherein the third onboard audio/video component comprises a high definition display on an exterior of the vehicle.

7. The method of claim 6, wherein at least one of the onboard audio/video components comprises at least one of a display, a speaker, a camera, and a microphone.

8. The method of claim 6, wherein at least one of the onboard audio/video components comprises an interior onboard audio/video component provided in an interior of the vehicle.

9. The method of claim 6, wherein the at least one of the onboard audio/video components comprises an exterior onboard audio/video component provided on an exterior of the vehicle.

10. The method of claim 6, wherein the conducting further comprises capturing at least one of the first video portion of the video communication session and the first audio portion of the video communication session using a third one of the onboard audio/video components.

11. The method of claim 6, wherein the third party is a passenger in a second AV, the conducting further comprising presenting to the third party at least one of the second video portion and the second audio using an onboard audio/video component of the second vehicle.

12. The method of claim 11, wherein the conducting further comprises capturing at least one of the first video portion of the video communication session and the first audio portion of the video communication session using a second onboard audio/video component of the second vehicle.

13. A method comprising:
- conducting a video communication session between a passenger of a vehicle for providing a rideshare service to the passenger and a third party located outside the vehicle and proximate the vehicle using a plurality of onboard audio/video components provided on a vehicle dispatched to provide a rideshare service to the passenger; wherein the conducting further comprises:
  - presenting to the passenger a first video portion of the video communication session and a first audio portion of the video communication session using at least a first one of the onboard audio/video components;
  - capturing a second video portion of the video communication session and a second audio portion of the video communication session using at least a second one of the onboard audio/video components, where the second video portion comprises a video of the passenger and the second audio portion comprises audio of the passenger; and
  - presenting to the third party the second video portion and the second audio using at least a third one of the onboard audio/video components of vehicle;
- wherein the first and second ones of the onboard audio/video components comprise interior onboard audio/video components provided in an interior of the vehicle and the third one of the onboard audio/video components comprises an exterior onboard audio/video component provided on an exterior of the vehicle.

14. The method of claim 13, further comprising capturing the least one of the second video portion of the video communication session and the second audio portion of the video communication session using a fourth one of the onboard audio/video components of the vehicle, wherein the fourth one of the onboard audio/video components comprises an exterior onboard audio/video component provided on an exterior of the vehicle.

15. The method of claim 13, wherein at least one of the onboard audio/video components comprises at least one of a display, a speaker, a camera, and a microphone.

16. The method of claim 13, wherein the third onboard audio/video component comprises a high definition display on an exterior of the vehicle.

* * * * *